(12) United States Patent
Ebreo et al.

(10) Patent No.: US 9,059,896 B2
(45) Date of Patent: Jun. 16, 2015

(54) SERVER-SIDE NETWORK PROBE

(75) Inventors: Arnold Ebreo, Freehold, NJ (US); Juan C. Lopez, Frisco, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 712 days.

(21) Appl. No.: 12/962,880

(22) Filed: Dec. 8, 2010

(65) Prior Publication Data

US 2012/0151092 A1  Jun. 14, 2012

(51) Int. Cl.
  *G06F 15/16* (2006.01)
  *G06F 15/177* (2006.01)
  *H04L 12/26* (2006.01)
(52) U.S. Cl.
  CPC .............. *H04L 43/04* (2013.01); *H04L 43/065* (2013.01); *H04L 43/12* (2013.01)
(58) Field of Classification Search
  CPC ........ H04L 43/04; H04L 43/12; H04L 43/065
  USPC ................................................ 709/220, 246
  See application file for complete search history.

(56) References Cited

U.S. PATENT DOCUMENTS

| 5,491,511 | A  | * | 2/1996  | Odle ............................ 348/153 |
| 7,561,549 | B2 | * | 7/2009  | Meier et al. ................... 709/220 |
| 7,624,164 | B2 | * | 11/2009 | Lu et al. ........................ 709/220 |
| 2004/0221270 | A1 | * | 11/2004 | Witchel et al. ................ 717/124 |
| 2010/0082707 | A1 | * | 4/2010  | Barbieri et al. ............... 707/809 |

OTHER PUBLICATIONS

Website material entitled "Frame Formats," by Cisco Corporation at website http://www.cisco.com/univercd/cc/td/doc/product/lan/trsrb/frames.htm obtained on Dec. 2, 2010; 22 pages.

\* cited by examiner

*Primary Examiner* — Minh-Chau Nguyen
(74) *Attorney, Agent, or Firm* — Hartman & Citrin LLC

(57) ABSTRACT

Methods, systems, and computer-readable media for retrieving device information from a remote network device through a server-side network probe are provided. An operation is executed to capture data packets received over a network at a particular interface in a server computer. Device-related packets are retrieved from the captured data packets. The device-related packets may be embodied in a binary file. The binary file is converted into a human-readable file. The device information is extracted from the human-readable file. The device information may regard a network device sending the device-related packets over the network.

18 Claims, 4 Drawing Sheets

./ss_netprobe -i hme0 ←—— 202

Collecting packets on the network............

| Hostname | Interface | Link | Speed | Duplex |
|---|---|---|---|---|
| jorma | hme0 | UP | 100 | FULL |

⎫204

***************************************************

Router Type
}Foundry Networks, Inc. FES4802-ILP, IronWare Version 04.0.00aTc1 Compi ⎬208
led on Mar 13 2008 at 00:47:41 labeled as FES04000a

***************************************************

Port Number on Router/Switch = ethernet45  ⎬210

Router/Switch Name = MDTWNJ21ESN317B  ⎬212

***************************************************

| Switch | Link Partner Autoneg | LP Setting |
|---|---|---|
| ENABLED | | 100_FULL |

SERVER-SIDE NETWORK PROBE

BACKGROUND

This application relates generally to the field of network probes. More specifically, the disclosure provided herein relates to server-side network probes capable of retrieving relevant information from network devices coupled to servers.

When troubleshooting a network problem, a local network administrator operating a server may be unable to determine whether the network problem originates from the server or from a remote network device, such as a router or a switch, coupled to the server over a computer network. For example, the local network administrator may be unable to verify whether connectivity issues are caused on the server-side or on the remote device-side. The local network administrator can manually verify connections made on the server-side. The local network administrator can also contact a remote network administrator to manually verify connections made on remote device-side. However, such manual verification can be subject to human error.

SUMMARY

Embodiments of the disclosure presented herein include methods, systems, and computer-readable media for retrieving device information from a remote network device through a server-side network probe. According to one aspect, a method for retrieving device information from a remote network device through a server-side network probe is provided. According to the method, an operation is executed to capture data packets received over a network at a particular interface in a server computer. Device-related packets are retrieved from the captured data packets. The device-related packets may be embodied in a binary file. The binary file is converted into a human-readable file. The device information is extracted from the human-readable file. The device information may regard a network device sending the device-related packets over the network.

According to another aspect, a system for retrieving device information from a remote network device through a server-side network probe is provided. The system includes a memory and a processor functionally coupled to the memory. The memory stores a program containing code for retrieving device information from the remote network device through the server-side network probe. The processor is responsive to computer-executable instructions contained in the program and configured to perform the following operations. An operation is executed to capture data packets received over a network at a particular interface in a server computer. Device-related packets are retrieved from the captured data packets. The device-related packets may be embodied in a binary file. The binary file is converted into a human-readable file. The device information is extracted from the human-readable file. The device information may regard a network device sending the device-related packets over the network.

According to yet another aspect, a computer-readable medium having instructions stored thereon for execution by a processor to perform a method for retrieving device information from a remote network device through a server-side network probe is provided. According to the method, an operation is executed to capture data packets received over a network at a particular interface in a server computer. Device-related packets are retrieved from the captured data packets. The device-related packets may be embodied in a binary file. The binary file is converted into a human-readable file. The device information is extracted from the human-readable file. The device information may regard a network device sending the device-related packets over the network.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

FIG. 2 is a diagram illustrating an example implementation of formatted output, in accordance with some embodiments.

DETAILED DESCRIPTION

The following detailed description is directed to methods, systems, and computer-readable media for retrieving device information from a remote network device through a server-side network probe. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
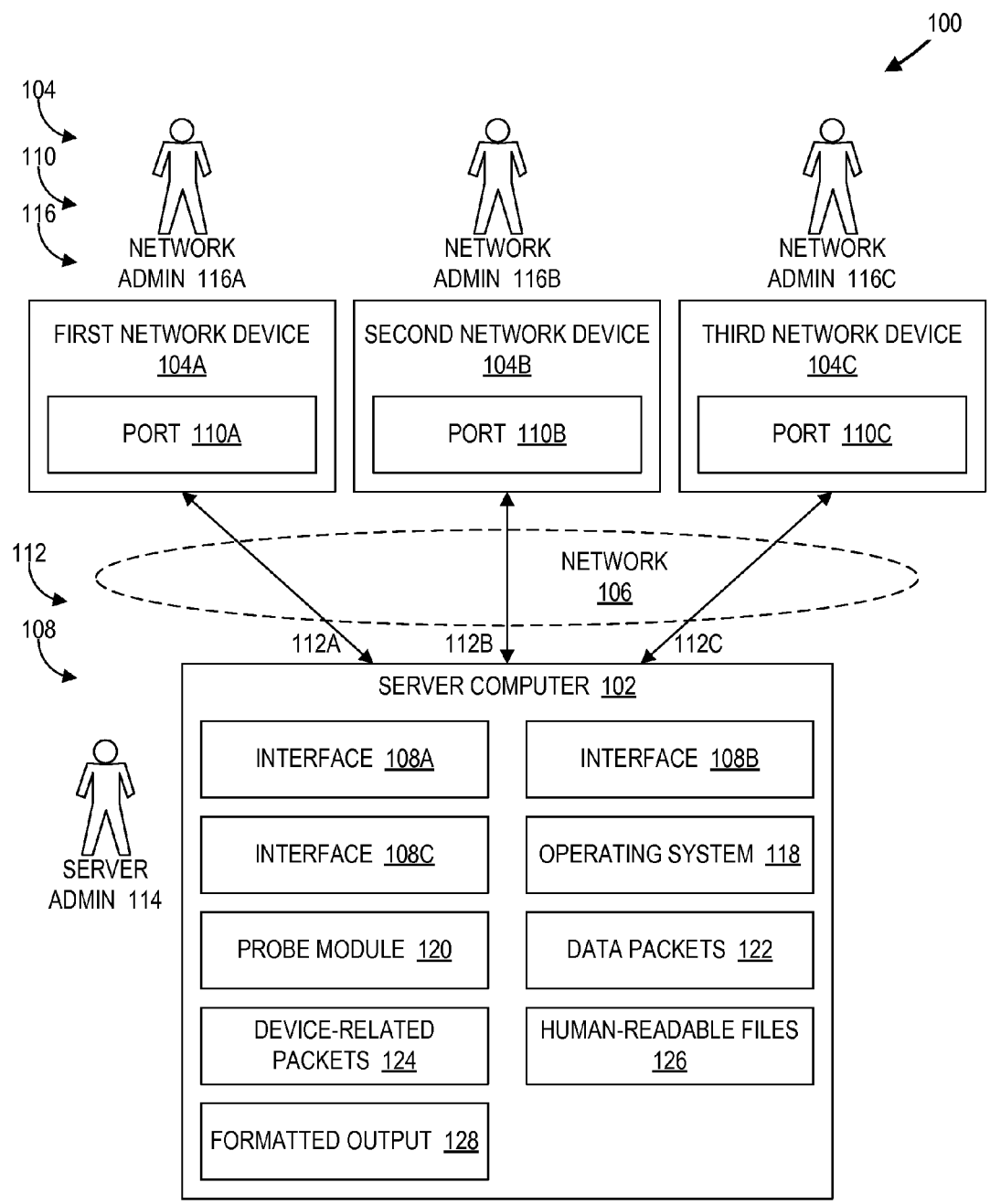
FIG. 1 is block diagram illustrating an example network architecture configured to retrieve device information from a remote network device through a server-side network probe, in accordance with some embodiments.

In the following detailed description, references are made to the accompanying drawings that form a part hereof, and which are shown by way of illustration, specific embodiments, or examples. Referring now to the drawings, in which like numerals represent like elements through the several figures, FIG. 1 is an example block diagram illustrating a network architecture 100 configured to retrieve device information from a remote network device through a server-side network probe, in accordance with some embodiments. The network architecture 100 may include a server computer 102, a first network device 104A, a second network device 104B, and a third network device 104C, which may be coupled via a computer network 106. The network devices 104A, 104B, 104C may be collectively referred to as network devices 104.

The server computer 102 and first network device 104A may be coupled via a server-side interface 108A on the server computer 102 and a device-side port 110A on the first network device 104A, thereby establishing a first link 112A between the server computer 102 and the first network device 104A. The server computer 102 and the second network device 104B may be coupled via a server-side interface 108B on the server computer 102 and a device-side port 110B on the first network device 104A, thereby establishing a second link 112B between the server computer 102 and the second network device 104B. The server computer 102 and third network device 104C may be coupled via a server-side interface 108C on the server computer 102 and a device-side port 110C on the third network device 104C, thereby establishing a third link 112C between the server computer 102 and the third network device 104C. The network devices 104 may include a router, a switch, and/or the like.

The server-side interfaces 108A, 108B, 108C may be collectively referred to as server-side interfaces 108. The device-side ports 110A, 110B, 110C may be collectively referred to as device-side ports 110. The device-side port 110A may be one of multiple device-side ports on the first network device 104A. The device-side port 110B may be one of multiple device-side ports on the second network device 104B. The device-side port 110C may be one of multiple device-side ports on the third network device 104C. The links 112A, 112B, 112C may be collectively referred to as links 112.

Conventionally, a local server administrator 114 at the server computer 102 has access to server information associated with the server computer 102 for the various links 112. With respect to the first link 112A, for example, some server information may include the name of the server computer 102 on the network 106, the port number of the device-side port 110A that connects to the server computer 102, the link status (e.g., up or down) of the server-side interface 108A, the link speed setting (e.g., 100 megabits/second) of the server-side interface 108A, and/or the duplex setting (e.g., full or half) of the server-side interface 108A. However, the local server administrator 114 may not have access to server information associated with each of the network devices 104 on the respective links 112. Thus, the local server administrator 114 may rely on remote network administrators 116A, 116B, 116C associated with the network devices 104. The remote network administrators 116A, 116B, 116C may be collectively referred to as remote network administrators 116.

When a connectivity issue arises on the first link 112A, for example, the local server administrator 114 may contact the first remote administrator 116A and request device information for the first network device 104A. Some examples of device information may include the name of the first network device 104A on the network 106, the device-side port 110A that forms the first link 112A, autonegotiation setting (e.g., enabled or disabled) of the device-side port 110A, port speed setting of the device-side port 110A, and/or duplex setting of the device-side port 110. The first remote administrator 116A may determine the requested device information by visually inspecting the first network device 104A and provide the requested device information to the local server administrator 114. The local server administrator 114 may then verify that the device information matches the corresponding server information. However, having the first remote administrator 116A manually determine the requested device information can be subject to human error. Further, the local server administrator 114 may have no way of verifying the accuracy of the device information provided by the first remote administrator 116A.

According to some embodiments, the server computer 102 may include an operating system 118 and a probe module 120. In one embodiment, the operating system 118 may be the SOLARIS operating system from ORACLE CORPORATION. In other embodiments, the operating system 118 may be any suitable operating system. The probe module 120 may be configured to execute an operation provided by the operating system 118 in order to capture data packets transmitted to the server computer 102 over one of the links 112. For example, if the operating system 118 is the SOLARIS operating system, the probe module 120 may execute a snoop operation, which is provided by the SOLARIS operating system, between the server-side interface 108A and the device-side port 110A in order to capture data packets 122 transmitted to the server computer 102 over the first link 112A. The probe module 120 may execute the snoop operation between the server-side interface 108B and the device-side port 110B in order to capture data packets transmitted to the server computer 102 over the second link 112B. The probe module 120 may execute the snoop operation between the server-side interface 108C and the device-side port 110C in order to capture data packets transmitted to the server computer 102 over the third link 112C.

The probe module 120 may execute the snoop operation for a specified period of time to capture the data packets 122 transmitted to the server computer 102 over the first link 112A. Upon capturing the data packets 122, the probe module 120 may be configured to retrieve device-related packets 124 from the data packets 122. The device-related packets 124 may be data packets periodically sent by the network devices 104 in order to share various data about the network devices 104.

For example, the device-related packets 124 may include CISCO DELIVERY PROTOCOL ("CDP") packets. The probe module 120 may retrieve the CDP packets from the data packets 122 by identifying data packets having a CDP header. The presence of a CDP header in a data packet may identify a CDP packet. A subset of the data packets 122 may have the CDP header. The CDP header may be in any location (e.g., top, middle, bottom, etc.) of a given data packet. As a result, the probe module 120 may scan the entire contents of each of the data packets 122 in order to determine whether the data packets 122 contain the CDP header.

The device-related packets 124 may be embodied in one or more binary files. When the probe module 120 retrieves the device-related packets 124, the probe module 120 may be configured to convert the binary files into one or more human-readable files 126, such as American Standard Code for Information Interchange ("ASCII") files. Any suitable techniques for converting binary files into ASCII files can be utilized. Upon converting the device-related packets 124 to the human-readable files 126, the probe module 120 may be configured to extract the device information from the human-readable files 126 and format the extracted device information into formatted output 128. For example, the device information may be extracted from noise and other irrelevant information contained in the human-readable files 126. The formatted output 128 may arrange and organize the extracted device information in a manner specified by the local server administrator 114.

The probe module 120 may provide the formatted output 128 to the local server administrator 114 upon request or at scheduled instances. The local server administrator 114 may utilize the formatted output 128 to verify connectivity between the server computer 102 and the first network device 104A over the first link 112A. For example, the local server administrator 114 can determine whether device information matches corresponding server information. The local server administrator 114 may determine connectivity issues when the device information does not match corresponding server information. The local server administrator 114 may also utilize the formatted output 128 to verify the accuracy of information related to the first network device 104A provided by the first remote administrator 116A.

Referring to FIG. 2, additional details will be provided regarding the formatted output 128. FIG. 2 is a diagram illustrating an example implementation of the formatted output 128, which is output from the probe module 120, in accordance with some embodiments. The formatted output 128 includes a comment line 202, which shows a command line utilized to initiate the probe module 120. In this example, "ss_netprobe" refers to a command that initiates the probe module 120, and "-i hme0" instructs the probe module 120 to capture data packets that are received at the interface "hme0." The formatted output 128 includes a server information portion 204, which specifies server information associated with a server computer, such as the server computer 102. In this example, the server information specifies a hostname of the server computer 102, a description of a server-side interface, such as the server-side interface 108A, receiving data packets that are captured by the probe module 120, a link status associated with a link to the server computer 102, a speed setting of the interface, and the duplex setting of the interface.

The formatted output 128 includes a device information portion 206, which specifies device information associated with a network device, such as the first network device 104A, coupled to the server computer 102 via the network 106. The device information portion 206 includes a device type portion 208, a port number portion 210, a name portion 212, and a configuration settings portion 214. The device information portion 206 specifies a type of the first network device 104A and additional information about the first network device 104A, such as the manufacturer and/or version number of the first network device 104A. The port number portion 210 specifies the port number of the device-side port 110A that couples the first network device 104A to the server computer 102. The name portion 212 specifies a name of the first network device 104A on the network 106. The configuration settings portion 214 specifies relevant configuration settings associated with the first network device 104A. In this example, the configuration settings include an autonegotiation setting of the device-side port 110A (e.g., "ENABLED"), port speed settings of the device-side port 110A (e.g., 100 megabits/second), and/or duplex settings of the device-side port 110 (e.g., "FULL").

Figure 3:
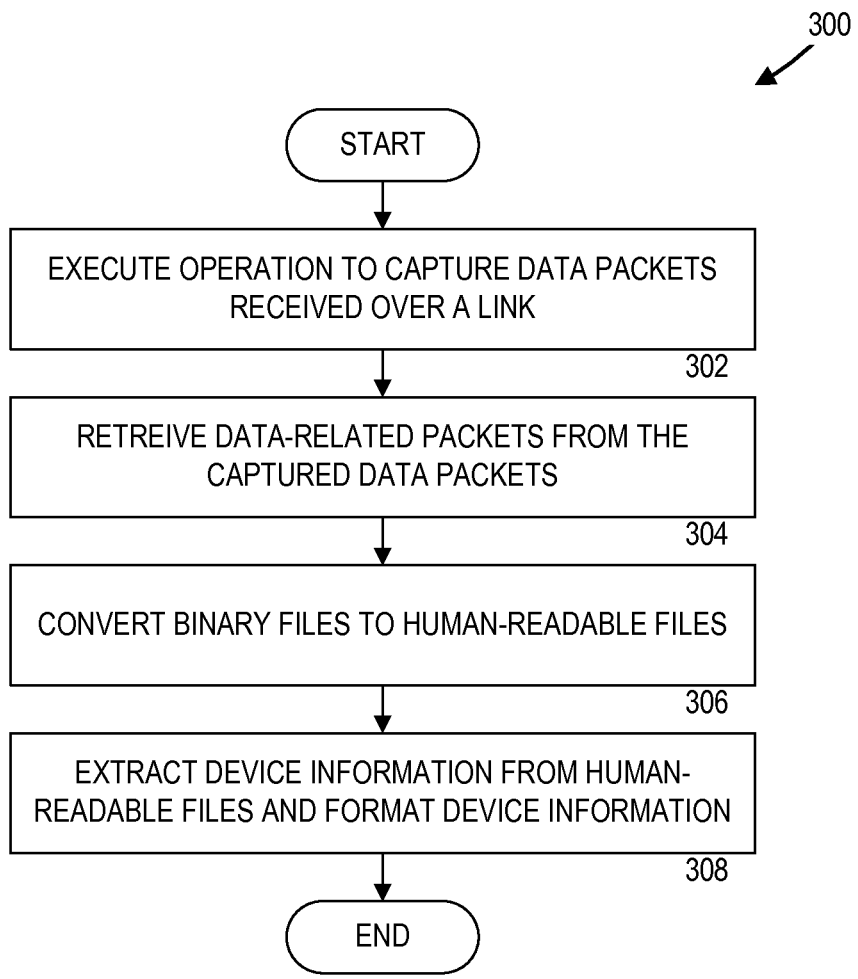
FIG. 3 is a flow diagram illustrating an example method for retrieving device information from a remote network device through a server-side network probe, in accordance with some embodiments.

Referring to FIG. 3, additional details will be provided regarding the operation of the probe module 120. In particular, FIG. 3 is a flow diagram illustrating an example method 300 for retrieving device information from a remote network device through a server-side network probe, in accordance with some embodiments. The method 300 begins at operation 302, where the probe module 120 executes an operation provided by the operating system 118 in order to capture data packets transmitted to the server computer 102 over one of the links 112. For example, the probe module 120 may execute a snoop command, which is provided by the SOLARIS operating system, for one of the interfaces 108 over a specified period of time. Over this period of time, the probe module 120 may capture multiple data packets, such as the data packets 122. The data packets 122 may be embodied in one or more binary files. When the probe module 120 executes the snoop operation, the method 300 proceeds to operation 304.

At operation 304, the probe module 120 retrieves device-related packets, such as the device-related packets 124, from the data packets 122. The device-related packets 124 may be data packets periodically sent by the network devices 104 in order to share various data about the network devices 104. For example, the device-related packets 124 may include CDP packets. The probe module 120 may retrieve the CDP packets from the data packets 122 by identifying data packets having a CDP header, which may identify a CDP packet. The CDP header may be in different locations of the various data packets. As a result, the probe module 120 may scan the entire contents of each of the data packets 122 in order to retrieve the device-related packets 124. When the probe module 120 retrieves the device-related packets 124, the method 300 proceeds to operation 306.

At operation 306, the probe module 120 converts the binary files into one or more human-readable files, such as the human-readable files 126. For example, the human-readable files 126 may be in ASCII format. When the probe module 120 converts the binary files into the human-readable files 126, the method 300 proceeds to operation 308, where the probe module 120 extracts the device information from the human-readable files 126 and formats the extracted device information into a formatted version, such the formatted output 128. The probe module 120 may present the formatted output 128 to the local server administrator 114. When the probe module 120 extracts the device information from the human-readable files 126 and formats the extracted device information into the formatted output 128, the method 300 may either repeat (e.g., periodically, continuously, or on demand as needed) or terminate.

Figure 4:
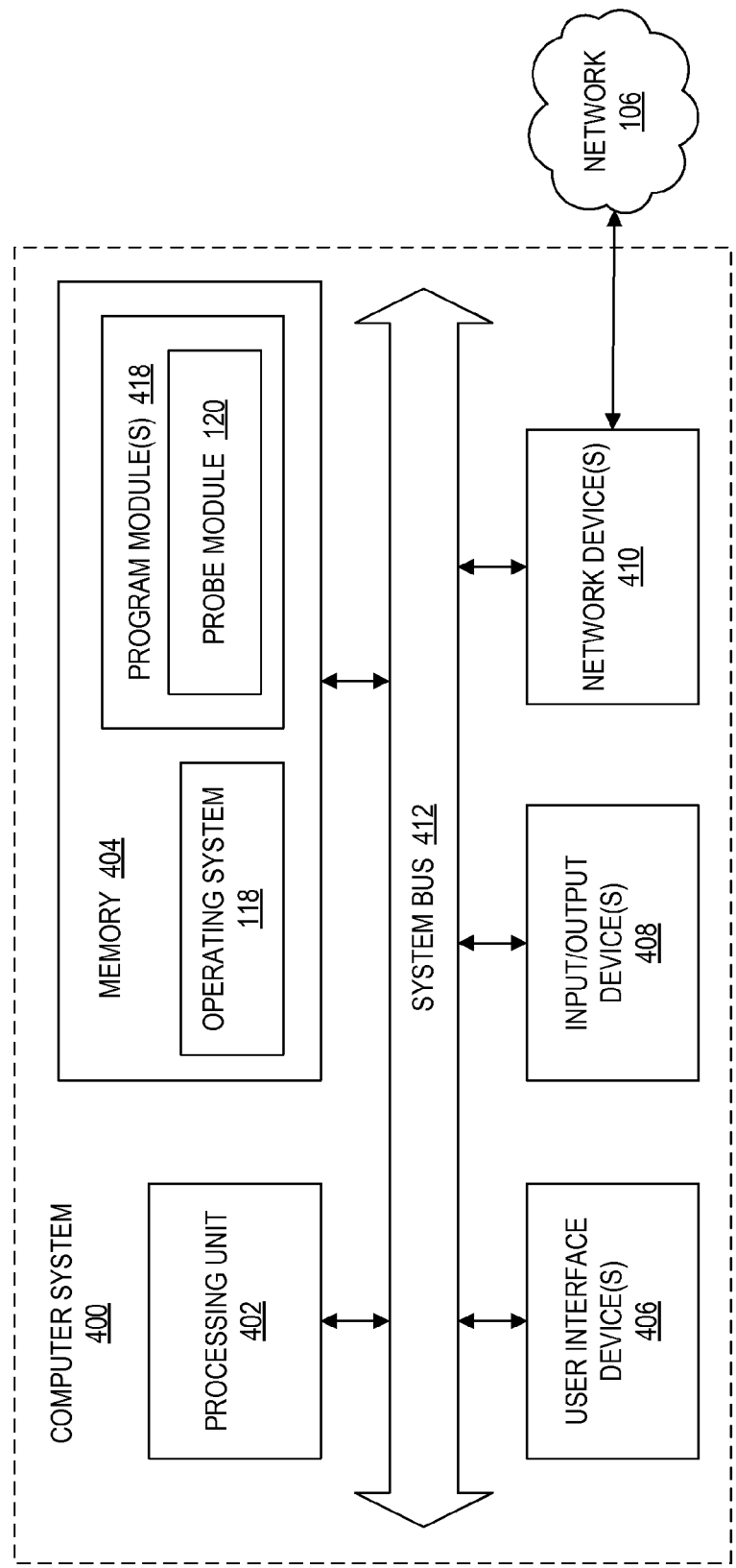
FIG. 4 is a block diagram illustrating an example computer system configured to retrieve device information from a remote network device through a server-side network probe, in accordance with some embodiments.

FIG. 4 and the following discussion are intended to provide a brief, general description of a suitable computing environment in which embodiments may be implemented. While embodiments will be described in the general context of program modules that execute in conjunction with an application program that runs on an operating system on a computer system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. The embodiments may also be practiced in distributed computing environments where tasks are performed by remote processing devices that are linked through a communications network. In a distributed computing environment, program modules may be located in both local and remote memory storage devices.

FIG. 4 is a block diagram illustrating a computer system 400 configured to retrieve device information from a remote network device through a server-side network probe, in accordance with embodiments. The computer system 400 includes a processing unit 402, a memory 404, one or more user interface devices 406, one or more input/output ("I/O") devices 408, and one or more network devices 410, each of which is operatively connected to a system bus 412. The bus 412 enables bi-directional communication between the processing unit 402, the memory 404, the user interface devices 406, the I/O devices 408, and the network devices 410.

The processing unit 402 may be a standard central processor that performs arithmetic and logical operations, a more specific purpose programmable logic controller ("PLC"), a programmable gate array, or other type of processor known to those skilled in the art and suitable for controlling the operation of the server computer. Processing units are well-known in the art, and therefore not described in further detail herein.

The memory 404 communicates with the processing unit 402 via the system bus 412. In one embodiment, the memory 404 is operatively connected to a memory controller (not shown) that enables communication with the processing unit 402 via the system bus 412. The memory 404 includes the operating system 118 and one or more program modules 418, according to exemplary embodiments. Examples of operating systems, such as the operating system 118, include, but are not limited to, WINDOWS, WINDOWS CE, and WINDOWS MOBILE from MICROSOFT CORPORATION, LINUX, SYMBIAN from SYMBIAN LIMITED, BREW from QUALCOMM CORPORATION, MAC OS from APPLE CORPORATION, FREEBSD operating system, and SOLARIS operating system from ORACLE CORPORATION. The program modules 418 may include the probe module 120. In some embodiments, the probe module 120 is embodied in computer-readable media containing instructions that, when executed by the processing unit 402, performs the method 300 for retrieving device information from a remote network device through a server-side network probe, as described in greater detail above with respect to FIG. 3. According to embodiments, the program modules 418 may be embodied in hardware, software, firmware, or any combination thereof.

By way of example, and not limitation, computer-readable media may comprise non-transitory computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 400.

The user interface devices 406 may include one or more devices with which a user accesses the computer system 400. The user interface devices 406 may include, but are not limited to, computers, servers, personal digital assistants, cellular phones, or any suitable computing devices. The I/O devices 408 enable a user to interface with the program modules 418. In one embodiment, the I/O devices 408 are operatively connected to an I/O controller (not shown) that enables communication with the processing unit 402 via the system bus 412. The I/O devices 408 may include one or more input devices, such as, but not limited to, a keyboard, a mouse, or an electronic stylus. Further, the I/O devices 408 may include one or more output devices, such as, but not limited to, a display screen or a printer.

The network devices 410 enable the computer system 400 to communicate with other networks or remote systems via a network, such as the network 106. Examples of the network devices 410 may include, but are not limited to, a modem, a radio frequency ("RF") or infrared ("IR") transceiver, a telephonic interface, a bridge, a router, or a network card. The network 106 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 106 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:

1. A method comprising:
    executing, by a processor executing a probe module, a snoop operation to capture data packets received over a network at a particular interface in a server computer;
    retrieving, by the processor, device-related packets from the data packets captured, the device-related packets embodied in a binary file;
    converting, by the processor, the binary file into a human-readable file;
    extracting, by the processor, device information from the human-readable file, the device information regarding a remote network device sending the device-related packets over the network;
    formatting the device information into a formatted output; and
    providing the formatted output for display, wherein the human-readable file comprises noise and other irrelevant information, and wherein extracting the device information from the human-readable file comprises extracting the device information from the noise and other irrelevant information.

2. The method of claim 1, wherein the formatted output further comprises a comment line that indicates a command line utilized to initiate the probe module.

3. The method of claim 2, wherein the formatted output further comprises a server information portion that specifies a hostname of the server computer.

4. The method of claim 1, wherein executing the snoop operation to capture the data packets received over the network at the particular interface in the server computer comprises executing the snoop operation over a period of time, the snoop operation being executed by an underlying operating system of the server computer.

5. The method of claim 1, wherein converting the binary file into the human-readable file comprises converting the binary file into an American Standard Code for Information Interchange file.

6. The method of claim 1, wherein extracting the device information from the human-readable file comprises extracting a device type of the remote network device, a port number of a port on the remote network device coupled to the server computer, a name of the remote network device on the network, an autonegotiation setting of the port, a port speed setting of the port, and a duplex setting of the port.

7. A system comprising:
    a processor; and a memory that stores computer executable instructions that, when executed by the processor, cause the processor to perform operations comprising
executing a snoop operation to capture data packets received over a network at a particular interface in a server computer,
retrieving device-related packets from the data packets captured, the device-related packets embodied in a binary file,
converting the binary file into a human-readable file,
extracting device information from the human-readable file, the device information regarding a network device sending the device-related packets over the network,
formatting the device information into a formatted output, and
displaying the formatted output, wherein the human-readable file comprises noise and other irrelevant information, and wherein extracting the device information from the human-readable file comprises extracting the device information from the noise and other irrelevant information.

8. The system of claim 7, wherein the formatted output further comprises a comment line that indicates a command line utilized to initiate the probe module.

9. The system of claim 8, wherein the formatted output further comprises a server information portion that specifies a hostname of the server computer.

10. The system of claim 7, wherein executing the snoop operation to capture the data packets received over the network at the particular interface in the server computer comprises executing the snoop operation over a period of time, the snoop operation being executed by an underlying operating system of the server computer.

11. The system of claim 7, wherein converting the binary file into the human-readable file comprises converting the binary file into an American Standard Code for Information Interchange file.

12. The system of claim 7, wherein extracting the device information from the human-readable file comprises extracting a device type of the network device, a port number of a port on the network device coupled to the server computer, a name of the network device, an autonegotiation setting of the port, a port speed setting of the port, and a duplex setting of the port.

13. A computer-readable storage medium having instructions stored thereon that, when executed by a processor, cause the processor to perform operations comprising:
executing a snoop operation to capture data packets received over a network at a particular interface in a server computer;
retrieving device-related packets from the data packets captured, the device-related packets embodied in a binary file;
converting the binary file into a human-readable file;
extracting device information from the human-readable file, the device information regarding a network device sending the device-related packets over the network;
formatting the device information into a formatted output; and
displaying the formatted output, wherein the human-readable file comprises noise and other irrelevant information, and wherein extracting the device information from the human-readable file comprises extracting the device information from the noise and other irrelevant information.

14. The computer-readable storage medium of claim 13, wherein the formatted output further comprises a comment line that indicates a command line utilized to initiate a probe module.

15. The computer-readable storage medium of claim 14, wherein the formatted output further comprises a server information portion that specifies a hostname of the server computer.

16. The computer-readable storage medium of claim 13, wherein executing the snoop operation to capture the data packets received over the network at the particular interface in the server computer comprises executing the snoop operation over a period of time, the snoop operation being executed by an underlying operating system.

17. The computer-readable storage medium of claim 13, wherein converting the binary file into the human-readable file comprises converting the binary file into an American Standard Code for Information Interchange file.

18. The computer-readable storage medium of claim 13, wherein extracting the device information from the human-readable file comprises extracting a device type of the network device, a port number of a port on the network device coupled to the server computer, a name of the network device, an autonegotiation setting of the port, a port speed setting of the port, and a duplex setting of the port.

* * * * *